DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 189

T942,003

FREE RADICAL PROMOTER FOR CURING POLYMERIC COMPOSITIONS

James L. Suggs, Rte. 12, Greeneville, Tenn. 37743, and William W. Blount, Jr., 1129 Oakleaf Drive, Rte. 12, Kingsport, Tenn. 37663

Filed Mar. 4, 1974, Ser. No. 447,598
Int. Cl. C08f *1/76, 21/02*
U.S. Cl. 260—864
No Drawing. 9 Pages Specification

Free radical copromoters for use in curing resin compositions comprising an unsaturated polyester and an ethylenically unsaturated copolymerizable monomer are disclosed for use with conventional initiators and conventional copromoters. The free radical copromoters comprise acetoacetarylides of the formula

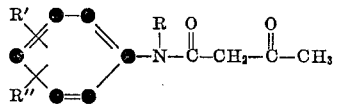

wherein R is H or $CH_3$, R′ is $CH_3$, Cl, $OCH_3$ or H, and R″ is $CH_3$ or H. The acetoacetarylides accelerate the curing of such resin compositions when used as copromoters with conventional cure systems comprised of promoters such as metal salts and peroxides.